Sept. 28, 1943. P. H. KEMMER 2,330,219
REINFORCED METAL COVERING FOR AIRCRAFT
Filed Aug. 13, 1940 2 Sheets-Sheet 1
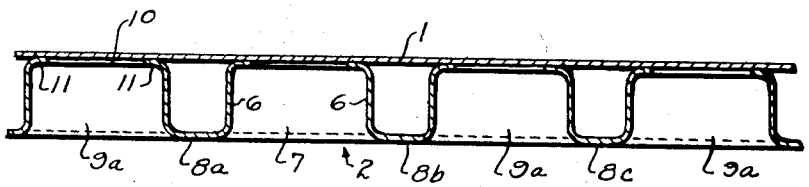

Sept. 28, 1943.  P. H. KEMMER  2,330,219
REINFORCED METAL COVERING FOR AIRCRAFT
Filed Aug. 13, 1940   2 Sheets-Sheet 2
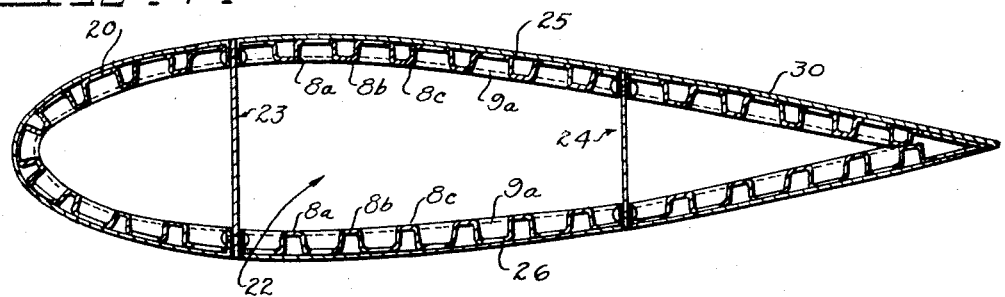
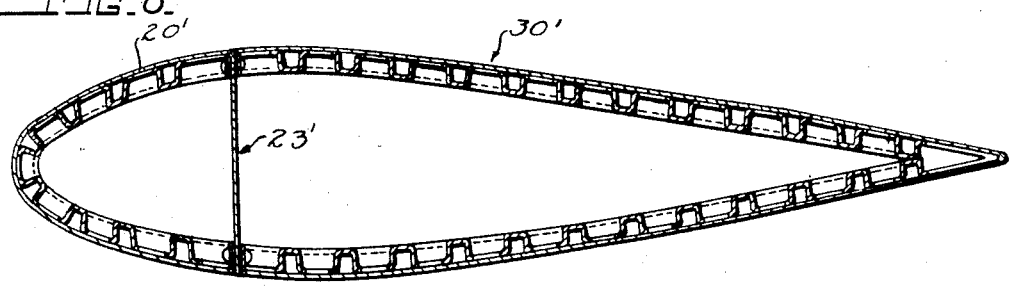
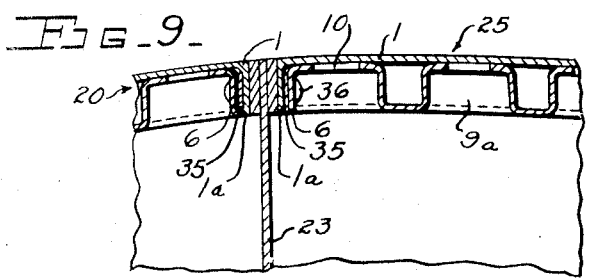
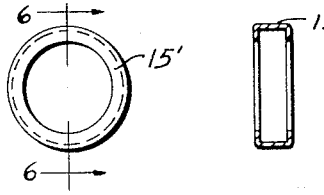
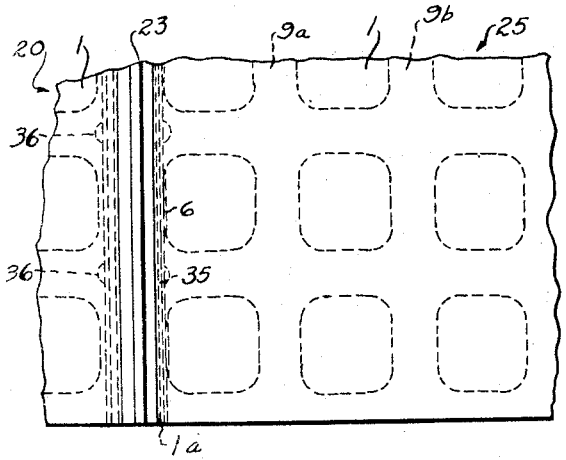
INVENTOR
PAUL H. KEMMER

UNITED STATES PATENT OFFICE 2,330,219

REINFORCED METAL COVERING FOR AIRCRAFT

Paul H. Kemmer, Fairfield, Ohio

Application August 13, 1940, Serial No. 352,404

1 Claim. (Cl. 244—133)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a stressed skin covering for aircraft and adapted for use as a load-carrying material in wings, fuselages, hulls, pontoons, control surfaces and the like.

In the construction of metal aircraft, in order to have the strength to weight ratio of the structural parts as high as possible, it is necessary to employ thin sheet metal coverings as stress-carrying elements and to stiffen the thin sheets by various types of reinforcements to prevent buckling due to shear stresses. In accordance with accepted practice, this stiffening is carried out by means of a multiplicity of longitudinal stringers of various shapes secured to the skin, combined with transverse stringers, ribs or rings, also secured to the skin, each longitudinal stringer and transverse stringer or ring being a separate element riveted or spot welded to the skin. At their points of intersection, such stringers must be connected to each other by separate clips attached by riveting or welding, further complicating the structure and increasing the cost of manufacture.

I am aware that it has been suggested in the prior art, as evidenced by the United States Patents 1,504,106 granted to Claudius Dornier, and 1,553,695 granted to Hugo Junkers, to stiffen the metal covering of aircraft by a sheet having deep drawn depressions therein secured to the metal skin by spot welding or riveting. So far as I am aware, however, the strengthening of a metal covering, in accordance with the invention, by means of a continuous sheet having deep formed depressions therein arranged in spaced relation so as to form intersecting channel members, with the open sides of the channels placed next to the covering sheet and secured to the covering by spot welding, the covering being secured to bent-over flanges formed on the channel legs, is new and novel. The intersecting channels, formed as above-noted, serve the same function as the longitudinal and transverse webs or stringers of the conventional structures, with the added advantage that the channels are formed from a single sheet, greatly reducing the cost of manufacture and making the attachment to the skin a simple spot welding operation. The integral formed channel members effectively serve to transfer loads from heavily stressed sections to lighter stressed points and, due to the rigidity of the structure at the points of intersection of the channels, shear loads from the covering material are not localized to create concentrated stress areas. At points of high stress concentration, the points of intersection of the channels may be reinforced by star shaped reinforcing plates, thus assisting in distributing concentrated loads, such as occur at fitting attachment points, into the covering material and adjacent structure.

The reinforced sheet material formed in accordance with the invention may be put to a variety of uses and is well adapted to the construction of fuselages and airfoil surfaces in sections, the covering sheet being bent over and joined with a reinforcing plate therebetween, to the side walls of one of the channels, either longitudinal or transverse, to form an attachment flange, and this construction forms a further novel feature of the invention.

The amounts of load carried respectively, by the channel members and the cover sheet, may be altered at will by varying the channel dimensions and the thickness of the material employed therein, as well as by controlling the thickness of the covering material.

The channel members are formed by deep drawing and punching preferably from a single sheet of metal, and the forming dies may be designed to impart any desired curvature to the channels so that the reinforced sheet material may be employed in the construction of various hollow bodies such as fuselages, boat hulls and wings.

The principal object of the invention is the formation of a reinforced sheet construction, especially adapted for use in aircraft, comprising a unitary sheet of material formed with spaced depressions arranged to form a plurality of intersecting channels, the legs of the channels at their outer ends being bent over to form attaching flanges, and a covering sheet of material secured over the open sides of said channels to said flanges.

A further object of the invention is the provision, in a reinforced sheet of the character described, of lightening apertures in the sheet forming the channel members, said apertures located between adjacent intersecting pairs of channels.

Another object of the invention is the provision, in a reinforced sheet of material of the character described, of an attaching flange along one or more edges of the sheet, formed by bending over the covering sheet and securing the same to the side walls of one of the channel members lying adjacent the edge of the sheet, to form a rigid attachment flange.

Other objects of the invention will appear by reference to the detailed description hereinafter given and to the appended drawings in which:

Figure 1 illustrates a bottom view of a reinforced sheet formed in accordance with the invention, and also illustrates a special channel reinforcing plate used to strengthen the channels at points of intersection where concentrated loads are applied;

Figure 2 is a sectional view taken along line 2—2 of Figure 1;

Figure 3 illustrates a front elevation of a star-shaped reinforcing plate illustrated in Figure 1;

Figure 4 is a sectional view taken on line 4—4 of Figure 3;

Figure 5 is a front elevation of a modified form of the reinforcing plate of Figure 3;

Figure 6 is a sectional view taken on line 6—6 of Figure 5;

Figure 7 is a sectional view illustrating the application of the reinforced sheet in sections to form a two spar aeroplane wing, or other airfoil surface;

Figure 8 is a sectional view illustrating the application of the reinforced sheet, in sections, to form a single spar wing or other airfoil surface;

Figure 9 is an enlarged sectional view illustrating the construction of the attaching flanges of the reinforced sheet section as employed in Figures 7 and 8; and Figure 10 is a top plan view of the attaching flange feature illustrated in Figure 9.

Referring now to Figures 1 and 2, the reference numeral 1 represents a thin metal sheet forming a stressed covering for an aircraft structure, and braced or reinforced by a second sheet of metal, generally indicated by the reference numeral 2, so formed as to stiffen the sheet 1 to resist longitudinal and transverse shear loads as well as bending loads applied normal to the sheet 1.

The sheet 2 is formed with a series of deep-drawn rectangular-shaped depressions generally indicated by the reference numeral 4. The rectangular cup-like depressions 4 are arranged in spaced aligned relation so as to form longitudinal and transverse rows. The longitudinal side walls 6, of the depressions 4, form the sides, or legs, of the open longitudinal channels indicated respectively by the reference characters 8a, 8b and 8c, while the transverse side walls of the depressions 4 form the side walls or legs of the transverse open channels indicated respectively by the reference characters 9a, 9b and 9c.

At the points of intersection, the walls of the channels are joined by well-rounded fillets. The bottoms of the cup-like depressions 4 are pierced by apertures 10 (Figure 2) for lightening purposes, leaving the flange portions 11 extending around the bottom of each depression, the flange serving as a means for securing the formed sheet 2 to the covering sheet 1. The final assembly is made by placing the cover sheet 1 over the open sides of the channels formed in the sheet 2 and securing the sheet 1 to the flanges 11 by spot welding, as indicated by the reference numeral 12 (Figure 1). The completed sheet may be curved in a single plane, or given compound curvature by forming the channels of sheet 2 in a suitably curved die, and the dimensions of the rectangular depressions 4 may be varied at various points of the sheet to obtain desired plan forms. Some of the channels may be discontinuous, it being essential, however, to have the side wall of a channel along the edges of the sheet so that attachment of other sheet assemblies may be made.

Figure 1 also illustrates a star-shaped reinforcing plate 15 employed wherever needed to strengthen the channel construction at points of intersection of the longitudinal and transverse channel members. The star-shaped reinforcing plate is placed at the bottom of the channels at their points of intersection and spot welded thereto as indicated at 17, in Figure 1. The reinforcing plate 15 is stiffened against buckling by means of bent-up flanges 16, as best seen in the detail illustrations of the plate in Figures 3 and 4. The flanges 16 also serve to stiffen the fillet flanges of the intersecting channels. These reinforcing plates may be used at points where concentrated stresses arise; for example, due to fitting attachments.

Figures 5 and 6 illustrate a modified form of reinforcing plate 15' comprising a channel-shaped ring made of sheet metal, the bottom of the channel being spot welded to the fillet flanges in the same manner as the flanges 16 of the reinforcing plate 15 of Figures 2 and 3. One of the flanges of the ring is spot welded to the sheet 2 at the point of intersection of a pair of channels, the reinforcing ring in general serving the same function as the star-shaped reinforcing plate 15 of Figures 3 and 4.

Figure 7 illustrates the use of the reinforced sheet in accordance with the invention to form an airplane wing of the stressed skin type. The wing is made in three parts, the nose section 20, the central box spar section 22 and the trailing edge section 30. The central section 22 comprises a metal front spar 23 and a similar metal rear spar 24, with the upper and lower interspar chord members formed of the reinforced sheets 25 and 26, respectively, similar in construction to the reinforced sheet illustrated in Figure 1. The longitudinal channels 8a, 8b, 8c, etc. of the upper and lower chord members form auxiliary spars or stringers, and the transverse channels 9a, etc. serve the functions of the ribs employed in conventional construction. The front spar 23, rear spar 24, upper chord member 25 and lower chord member 26 together form a rigid box beam of light weight and great strength, and the novel channel construction enables the outer skin or covering to be highly stressed without buckling. The nose, or leading edge portion 20, and the trailing edge portion 30 are similarly constructed of the reinforced sheet, in accordance with the invention, and attached to the front side of the front spar and the rear side of the rear spar, respectively, and due to the inherent stiffness of the reinforced sheets, no internal formers are necessary.

Figure 8 illustrates a wing or other airfoil employing a single spar 23', a nose or leading edge portion 20' and a trailing portion 30', the nose and trailing portions being constructed of the reinforced sheet, in accordance with the invention, and secured to the front and rear sides of the spar 23'. The construction is otherwise identical to that previously described above with reference to Figure 7.

Figures 9 and 10 illustrate the typical manner of attaching reinforced sheet elements, in accordance with the invention, to each other, or, for example, to the spar 23 of Figure 7. The formed sheet 2 (Figure 1) is terminated along the edge of the desired joint by the side walls 6, of a longitudinally extending channel, and the extending edge of the covering sheet 1 is bent down to form a flange 1a, parallel with the side walls 6 of the channel but spaced therefrom. A metal stiffening strip 35 is then inserted in the space between the channel side walls and the flange 1a and secured in assembled relation by means of a sufficient number of heavy spot welds, or by flush rivets, thus giving a stiff attaching flange extending at substantially right angles to the main body of the reinforced sheets. The reinforced sheets are then secured to each other, or to a spar or other structural element, by means of rivets 36 as seen in Figure 9. This type of joint leaves a smooth exterior and rivets are employed in preference to spot welds due to their reliability under heavy stresses. If desired, bolts may be employed in place of rivets.

In order to secure the various reinforced sheets to the spars as in Figure 7, employing the type of connection illustrated in Figures 9 and 10, a portion of the outer covering 1 along the underside of the nose section 20 and the trailing edge section, is not secured to the channels of formed sheet 2 (Figure 1) and is bent downward allowing access for riveting tools through lightening holes (not shown) in the webs of spars 23 and 24 so that the various sections can be riveted to the spars by rivets 36 (Figure 9). The loose covering 1 may then be formed into place and secured to the channels by metal screws or rivets from the outside of the completed wing.

Having now described my invention and the manner in which it is to be applied, what I claim as my invention and wish to secure by Letters Patent is:

A stressed skin sheet metal aircraft covering material comprising a unitary sheet having rectangular depressions formed therein, said depressions being spaced apart to form a plurality of intersecting channels having the open sides of said channels on one side of said sheet, each of said rectangular depressions having the major portion of the area of the bottom thereof pierced by an aperture to thereby provide a narrow attaching flange extending around the sides of each depression, a second unitary metal sheet placed over the first named sheet to cover the open sides of said channels and rigidly secured to the attaching flanges of said first sheet, the side wall of one of said channels forming an edge of said first-named sheet and said second sheet having a bent over portion parallel with but spaced from the side wall of said one channel, and a metal spacing strip inserted between and united with said one channel side wall and the bent over portion of said second sheet to thereby form a rigid attaching flange for said braced sheet structure.

PAUL H. KEMMER.